S. B. ZARTMAN.
PNEUMATIC WHEEL.
APPLICATION FILED DEC. 28, 1917.

1,302,265.

Patented Apr. 29, 1919.

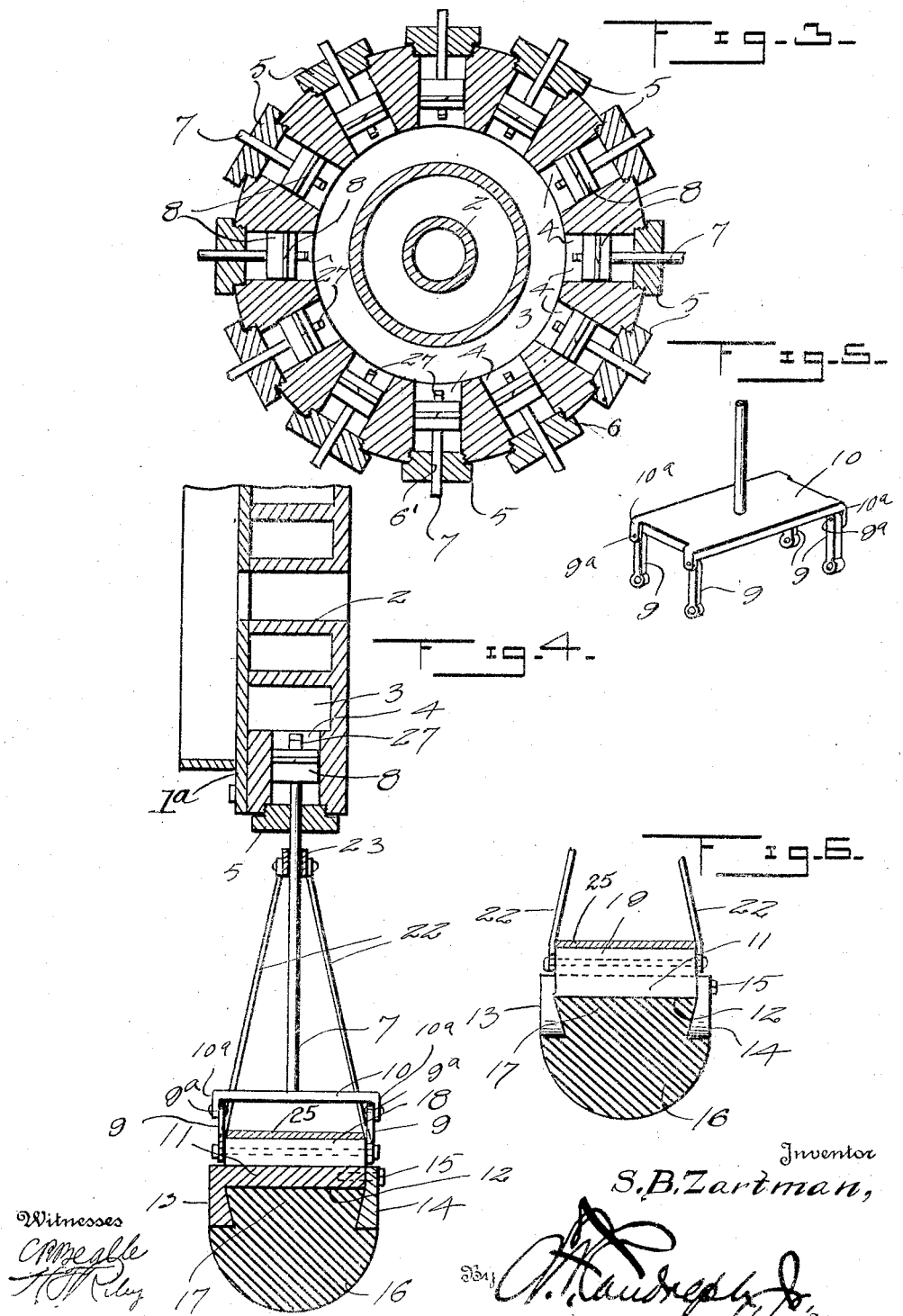

UNITED STATES PATENT OFFICE.

SAMUEL B. ZARTMAN, OF NILES, MICHIGAN, ASSIGNOR OF ONE-HALF TO BENJAMIN F. BARBER, OF NILES, MICHIGAN.

PNEUMATIC WHEEL.

1,302,265.   Specification of Letters Patent.   Patented Apr. 29, 1919.

Application filed December 28, 1917. Serial No. 209,316.

*To all whom it may concern:*

Be it known that I, SAMUEL B. ZARTMAN, a citizen of the United States, residing at Niles, in the county of Berrien and State of Michigan, have invented certain new and useful Improvements in Pneumatic Wheels; and I do hereby declare the following to be a full, clear, and exact description of the invention, such as will enable others skilled in the art to which it appertains to make and use the same.

This invention relates to a pneumatic wheel.

The object of the present invention is to improve the construction of pneumatic wheels and to provide a simple, practical and efficient pneumatic wheel of strong, durable and comparatively inexpensive construction designed for use on automobiles and various other vehicles and capable of enabling a solid rubber tire to be employed and of eliminating pneumatic tires and the trouble and expense incident to tire punctures, blowouts and similar troubles.

With these and other objects in view, the invention consists in the construction and novel combination of parts hereinafter fully described, illustrated in the accompanying drawings and pointed out in the claims hereto appended; it being understood that various changes in the form, proportion, size and minor details of construction, within the scope of the claims, may be resorted to, without departing from the spirit or sacrificing any of the advantages of the invention.

In the drawings:

Fig. 3 is a sectional view of the inner portion or hub of the wheel.

Fig. 4 is a sectional view taken radially of the wheel and showing one of the main spokes in side elevation.

Fig. 5 is a detail view of a portion of one of the main spokes.

Fig. 6 is a detail sectional view through the tire and rim, a portion of the auxiliary spokes being shown in side elevation.

Like numerals of reference designate corresponding parts in the several figures of the drawings.

Figure 1:
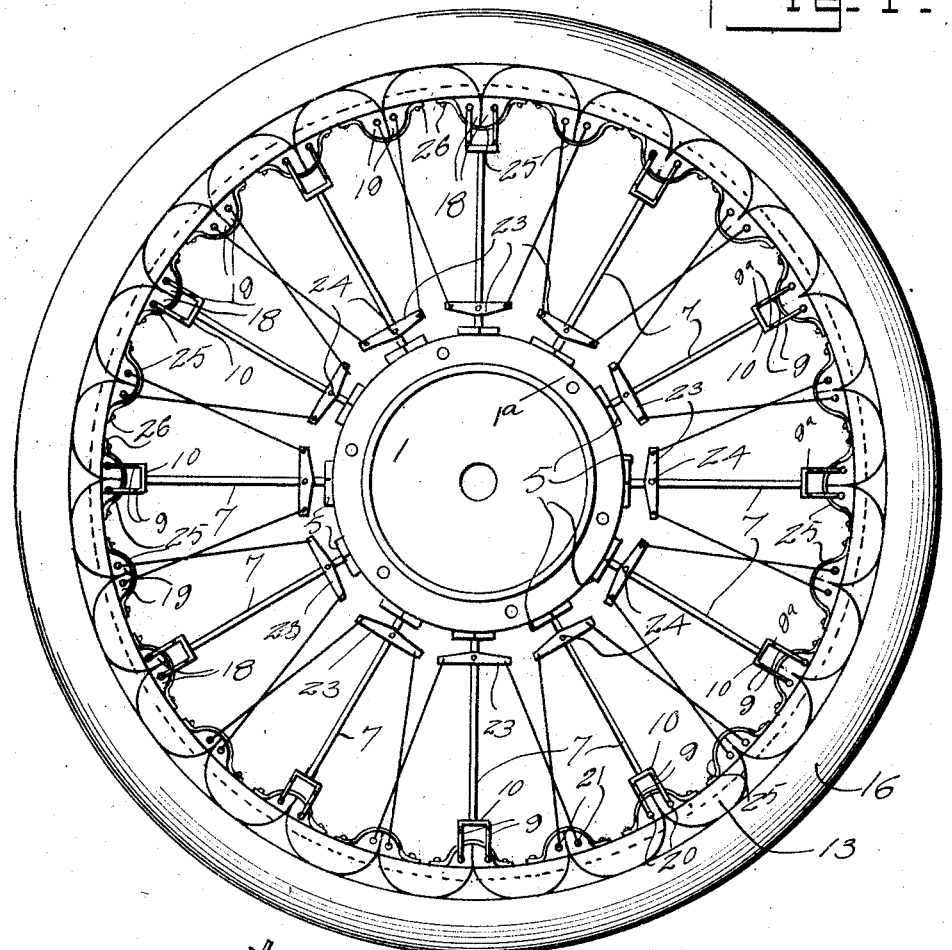
Figure 1 is a side elevation of a pneumatic wheel constructed in accordance with this invention.
Figure 2:
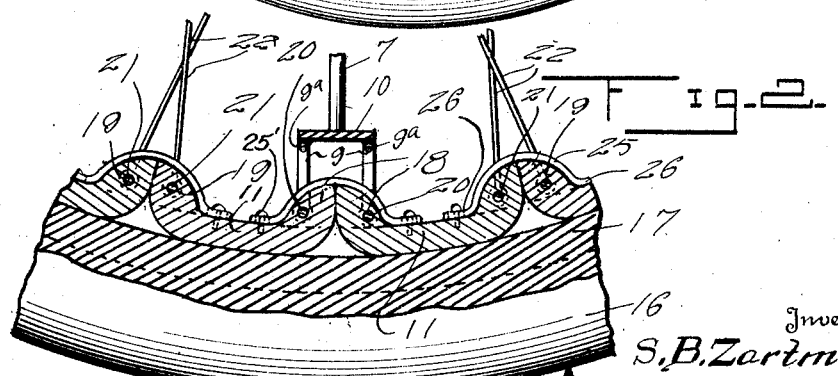
Fig. 2 is an enlarged sectional view of a portion of the tire and rim.

In the accompanying drawings, in which is illustrated the preferred embodiment of the invention, the pneumatic wheel comprises in its construction a hub section 1 having a removable side plate 1ª bolted or otherwise secured to the hub section, which is provided with an axle box or bearing portion 2 adapted to receive any suitable bearing for enabling the wheel to be applied to various types of automobiles and various other vehicles. The hub section is provided with an annular air chamber 3 and it has an annular series of radially arranged cylinders 4 extending outwardly from the air chamber and threaded at their outer ends for the reception of heads 5. Any suitable valve mechanism may be employed for enabling the desired pressure to be supplied to the air chamber for adapting the wheel to the particular type of automobile or motor truck or the like on which it is to be used, and the structure will be varied in size to provide the necessary strength.

The cylinder heads 5 have polygonal wrench receiving portions 6 and main spokes 7 extend through the openings 6' in the heads and are equipped with piston heads 8 which operate within the cylinders 4 and which are provided with suitable packing, to render them air tight and to prevent any leakage of the fluid pressure. The annular series of radially arranged cylinders are formed by cylindrical openings, but the cylinders may be of any other desired formation, as will be readily apparent. The main spokes are provided at their outer ends with arms 9 arranged in pairs and connected with the spokes by plates 10 and they connect the main spokes with a flexible rim composed of sections 11 each having a dove-tailed groove 12 formed by an integral flange 13 and a detachable flange 14 secured to the rim section 11 by suitable fastening devices 15 for enabling a solid rubber tire 16 to be readily applied to and removed from the flexible rim. The solid rubber tire, which may be of any desired construction and made of any desired resiliency to adapt it for light or heavy service, is provided with a dove-tailed rib or inner portion 17 which is interlocked with the dove-tailed groove of the sections of the flexible rim.

The rim sections present curved rounded outer faces or outer edges and the main spokes are connected with the pairs of rim sections at the ends thereof and the said rim sections are provided with eyes 18 and 19 to receive fastening devices 20 and 21 for connecting the rim sections with the arms of the main spokes and with the outer ends of auxiliary spokes 22 which diverge from crossheads 23 pivoted at 24 to the inner portions of the main spokes. The arms 9 are pivoted at their inner ends at 9ᵃ to ears 10ᵃ of the plates 10 and the main and auxiliary spokes are alternately arranged and the auxiliary spokes are crossed as shown.

The pneumatic wheel is adapted to absorb and dissipate the jars and vibrations incident to both the rough surfaces of a roadway and also the starting and stopping of a motor vehicle and the like, and will afford the cushioning action of air without liability of punctures, blowouts and similar troubles incident to pneumatic tires.

The rim sections are yieldably connected by means of springs 25 consisting of leaves or plates curved as shown and having their terminals 26 secured to the rim setions at the inner peripheries thereof. Retaining screws 25' extend through longitudinal slots in the end portions of the springs 25, thus permitting the end portions of the springs 25 to partake of a slight longitudinal movement. These springs yieldably maintain the sections in alinement and they may be made as stiff or resilient as required.

The piston heads are provided with lugs 27 which are adapted to engage the inner wall of the air chamber to limit the inward movement of the piston heads and the main spokes to prevent the piston heads from leaving the cylinders, but any other suitable means may be employed for limiting the inward movement of the piston heads.

What is claimed is:

1. A pneumatic wheel comprising, a centrally arranged hub; an air chamber surrounding the hub; cylinders radiating from the air chamber; pistons arranged within the cylinders; cylinder heads secured to the outer portions of the cylinders and having centrally arranged openings therein; main spokes connected at their inner ends with the pistons and extending through the openings in said cylinder heads; a flexible rim secured to the outer ends of said spokes; auxiliary spokes connected with said main spokes and with the rim sections of said flexible rim; and a tire arranged on said rim.

2. A pneumatic wheel comprising, a centrally arranged hub; an air chamber surrounding the hub; cylinders radiating from the air chamber; pistons arranged within the cylinders; cylinder heads secured to the outer portions of the cylinders and having centrally arranged openings therein; main spokes connected with the pistons and extending through the openings in said cylinder heads; a flexible rim secured to the outer ends of said spokes; auxiliary spokes connected with the main spokes at the inner portions thereof and disposed in pairs at opposite sides of said main spokes and connected with said flexible rim; and a tire arranged on said flexible rim.

3. A pneumatic wheel including an inner or hub section having an air chamber and provided with cylinders communicating with and extending outwardly from the air chamber, main spokes having piston heads operating in the cylinders, cross heads pivotally mounted on the main spokes at the inner portions thereof and extending from opposite sides of the same, auxiliary spokes pivoted to and diverging from the cross heads and arranged in pairs between the main spokes, and a flexible rim connected with the main and auxiliary spokes, and including a plurality of sections.

4. A pneumatic wheel including an inner or hub section having an air chamber and provided with cylinders communicating with the air chamber, main spokes having piston heads operating in the cylinders, said main spokes being provided at their outer ends with arms arranged in pairs, auxiliary spokes arranged in pairs at opposite sides of the main spokes and pivotally connected at their inner ends with the same and crossed intermediate their ends, and a flexible rim including sections extending across the space between the main and auxiliary spokes and pivotally connected with the latter and with the arms of the former.

5. A pneumatic wheel including an inner or hub section having an air chamber and provided with cylinders communicating with the air chamber, spokes having piston heads operating in the cylinders, a flexible rim composed of sections connected with the spokes, and springs arranged at the inner faces of the sections of the rim and loosely secured at their terminals to the same for yieldably maintaining the sections in alinement.

6. A pneumatic wheel including an inner or hub section having an air chamber and provided with cylinders communicating with the air chamber, spokes having piston heads operating in the cylinders, a flexible rim composed of sections connected with the spokes, and an annular series of curved springs arching the ends of the rim sections at the inner faces thereof and having their terminals loosely secured to the same.

7. A pneumatic wheel including an inner or hub section having an annular air chamber and provided with radially arranged cylinders extending outwardly therefrom, spokes having piston heads operating in the cylinders and provided with means to limit the inward movement of the piston heads to prevent the same from leaving the cylinders.

In testimony whereof I affix my signature in presence of two witnesses.

SAMUEL B. ZARTMAN.

Witnesses:
GEORGE CRANSON,
J. W. WRIGHT.

Copies of this patent may be obtained for five cents each, by addressing the "Commissioner of Patents, Washington, D. C."